(12) United States Patent
St. Pierre

(10) Patent No.: US 6,874,012 B1
(45) Date of Patent: Mar. 29, 2005

(54) SYSTEM AND METHOD FOR A DISPLAY DEVICE USING A PRIORITY MESSAGING PROTOCOL

(75) Inventor: Robert P. St. Pierre, Sunnyvale, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 689 days.

(21) Appl. No.: 09/704,093

(22) Filed: Nov. 1, 2000

(51) Int. Cl.[7] .............................................. G06F 15/16
(52) U.S. Cl. ...................... 709/207; 709/225; 701/29; 701/36
(58) Field of Search ................................ 709/200, 203, 709/220, 230, 244, 223

(56) References Cited

U.S. PATENT DOCUMENTS

| | | | |
|---|---|---|---|
| 5,394,137 A | * 2/1995 | Orschek ..................... | 340/453 |
| 6,021,429 A | * 2/2000 | Danknick ................... | 709/208 |
| 6,052,750 A | * 4/2000 | Lea ............................. | 710/72 |
| 6,108,727 A | * 8/2000 | Boals et al. ................. | 710/68 |
| 6,160,796 A | * 12/2000 | Zou ............................ | 370/257 |
| 6,246,693 B1 | * 6/2001 | Davidson et al. .......... | 370/445 |
| 6,360,152 B1 | * 3/2002 | Ishibashi et al. ........... | 701/48 |
| 6,505,100 B1 | * 1/2003 | Stuempfle et al. ......... | 701/1 |
| 6,542,076 B1 | * 4/2003 | Joao ........................... | 307/10.2 |
| 6,631,399 B1 | * 10/2003 | Stanczak et al. ............ | 709/206 |
| 6,757,262 B1 | * 6/2004 | Weisshaar et al. .......... | 370/310 |

OTHER PUBLICATIONS

Cordingley, Peter, "Future Cars: Hit The Road, Chip" Asiaweek, Feb. 23, 2001; World Reporter [retrieve on Mar. 13, 2001]. Retrieved from Dialog Information Services, Palo Alto, Canada, USA. Dialog Accession No. 15292300.

* cited by examiner

Primary Examiner—Hosain Alam
Assistant Examiner—B R Bruckart
(74) Attorney, Agent, or Firm—Lahive & Cockfield, LLP

(57) ABSTRACT

A display device executing a network messaging protocol and capable of receiving display requests from multiple network devices communicating with the display device over an Internet Protocol (IP) based network is disclosed. The network priority messaging protocol executed by the display device enables the display device to efficiently display messages received from multiple network devices. The protocol enables the display device to prioritize among incoming messages from different network devices and to prioritize among incoming multiple messages from a single device. The protocol executed by the display device further enables the display device to receive display characteristics encoded as part of a message from a network device. The display device executing the network priority messaging protocol is able to process and display multiple message requests without the need to prematurely overwrite the message currently being displayed or to segment the display surface of the display device into smaller pieces.

16 Claims, 16 Drawing Sheets

Figure 4B
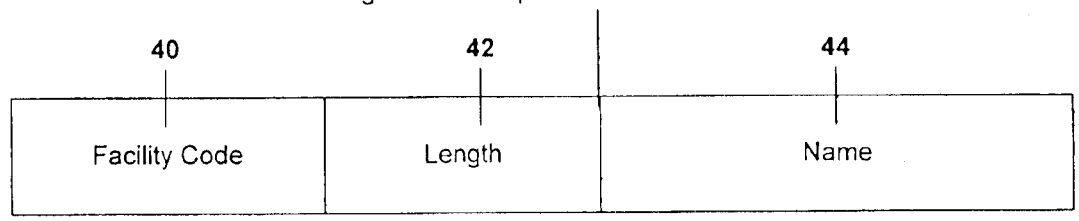
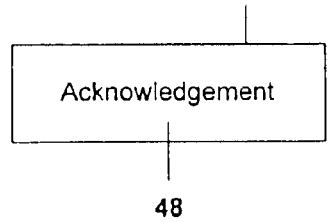

SYSTEM AND METHOD FOR A DISPLAY DEVICE USING A PRIORITY MESSAGING PROTOCOL

TECHNICAL FIELD

The present invention relates generally to the display of messages from multiple electronic devices by a network connected display device, and more particularly, to a display device executing a priority messaging protocol.

BACKGROUND OF THE INVENTION

Display devices connected to a network are often used to display data to a user that originates from other devices attached to the network. This process works satisfactorily when the display device is dedicated to a single Application/Device. However, problems occur when more than one network device at a time attempts to use the display device.

There are currently two main approaches for allowing multiple network devices to share a single display device. In the first approach, the display device partitions its display surface upon which the messages are displayed to the user into separate discrete areas. Each discrete area becomes dedicated to a single device/application. Any network device sending a message to the display device has its display message redirected to the portion of the display surface assigned to that network device. The result of such an approach, is that each display device has less available display surface dedicated to each device. Accordingly, the size of the message being displayed is reduced, sometimes greatly reduced. Another approach allows information to be displayed from a device when received, thereby overwriting information displayed for another device on the display surface. This approach automatically displays an incoming message upon its receipt with no prioritization factored into the display process. The problem caused by this approach is that important messages may get overwritten by less important messages. For example, in an automobile, a display device might display a warning about low fuel levels on its display surface and have the message overwritten by a warning about low windshield washer fluid levels. Since the messages aren't prioritized as they arrive, the resultant display of messages occurs in an inconsistent and haphazard fashion.

Neither of the current approaches described above provides an optimal solution to the problem of multiple networked devices sharing a single display device. Either the messages are inconsistently displayed, or the displayed messages quickly get too small to easily read.

SUMMARY OF THE INVENTION

The present invention addresses the display limitations encountered by display devices attempting to display messages received from multiple network devices. It enables a display device to efficiently allocate its display surface while receiving messages from multiple network devices. The present invention allows a display device to prioritize the messages received from multiple network devices or multiple messages from a single network device, allows the display device to communicate with other network devices over an (IP) based network, and further enables the display device to accept detailed display characteristics for a message as part of the received message.

In accordance with one aspect of the present invention, a method is practiced whereby a display device executes a priority messaging protocol which allows the display device to efficiently display messages received from multiple network devices. A display device executing the protocol of the present invention first requires a network device to register with the display device. The display device, which runs the server side of the protocol, responds to a registration request from a network device by assigning to the network device a Device ID and sending a registration response message back to the network device. As part of the registration process, the display device creates a priority message queue in the display device's onboard memory for each registering network device. Subsequent messages received from the network device are placed in the message queue allocated to that network device. Each network device queue is assigned a different priority level according to the importance of the network device as determined by the user of the display device. Additionally, each message received by the display device has a message priority level encoded into the message. The message priority level is set by the network device. The messaging protocol executed by the display device includes an algorithm which constantly searches for the highest priority message queue containing a message, and then selects the message from within that queue which has the highest message priority level for display. The protocol further enables the dequeuing (removal) of a message from a particular device queue, the ability for the display device to provide a network device with a list of all of the Message Identification numbers in its assigned queue, and provides for the unregistering of the network device when the device is done accessing the display device.

In an alternative embodiment of the present invention, the network environment used by the present invention is located within a motor vehicle. The display device receives messages from electronic devices connected to the motor vehicle network, such as a CD player, stereo, global positioning satellite receiver, etc. The protocol functions exactly the same for a motor vehicle network as it does for networks which are not located in a motor vehicle. Those skilled in the art will recognize that the electronic devices listed above as part of the motor vehicle network are listed for illustration purposes and are not a definitive list of the electronic devices that may be attached to the motor vehicle network.

BRIEF DESCRIPTION OF THE DRAWINGS

FIG. 4B is a block diagram that shows the format utilized in the body of the message packet during a network device registration request and display device response to a registration request;

DETAILED DESCRIPTION OF THE INVENTION

The illustrative embodiment of the present invention enables a display device to receive display requests from multiple network devices communicating with the display device over an Internet Protocol (IP) based network. The priority messaging protocol executed by the display device enables a display device to prioritize and display incoming messages from different network devices and to prioritize and display multiple incoming messages from a single device. The protocol executed by the display device further enables the display device to receive display characteristics encoded as part of a message from a network device. The illustrative embodiment of the present invention allows a display device executing the priority message protocol to process and display multiple message requests without the need to prematurely overwrite the message currently being displayed or to segment the display surface of the display device into smaller pieces.

Figure 1:
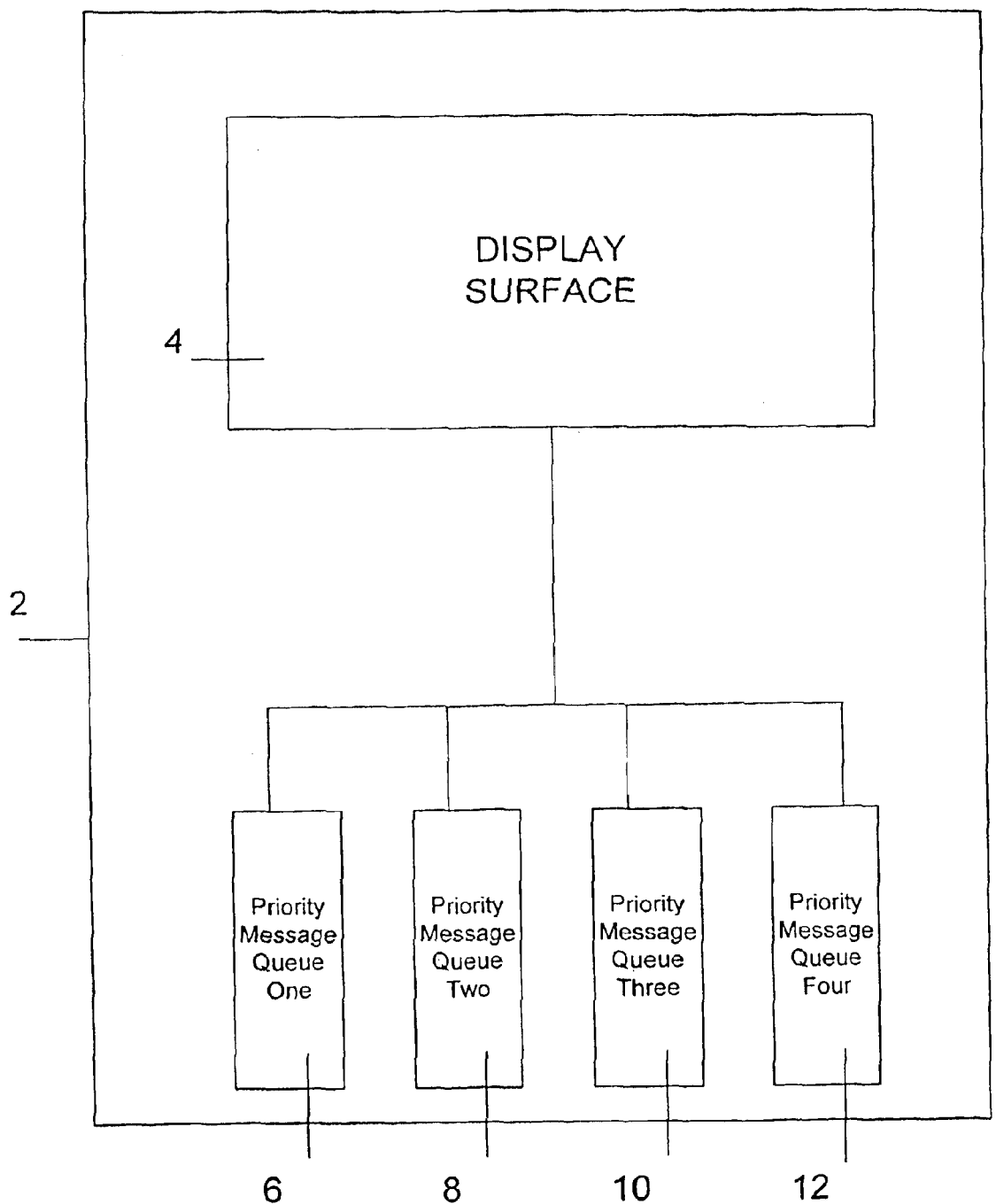
FIG. 1 is a block diagram illustrating components employed in an illustrative embodiment of the present invention.

FIG. 1 depicts a display device configured in accordance with the illustrative embodiment of the present invention. The display device 2 contains a display surface 4, and priority message queues 6, 8, 10 and 12. In the embodiment depicted in FIG. 1, the display device 2 has created the four priority message queues 6, 8, 10, and 12, to hold incoming messages for four respective registered network devices. Messages received from the registered network devices are placed in the priority message queue allocated to the respective devices.

Figure 2:
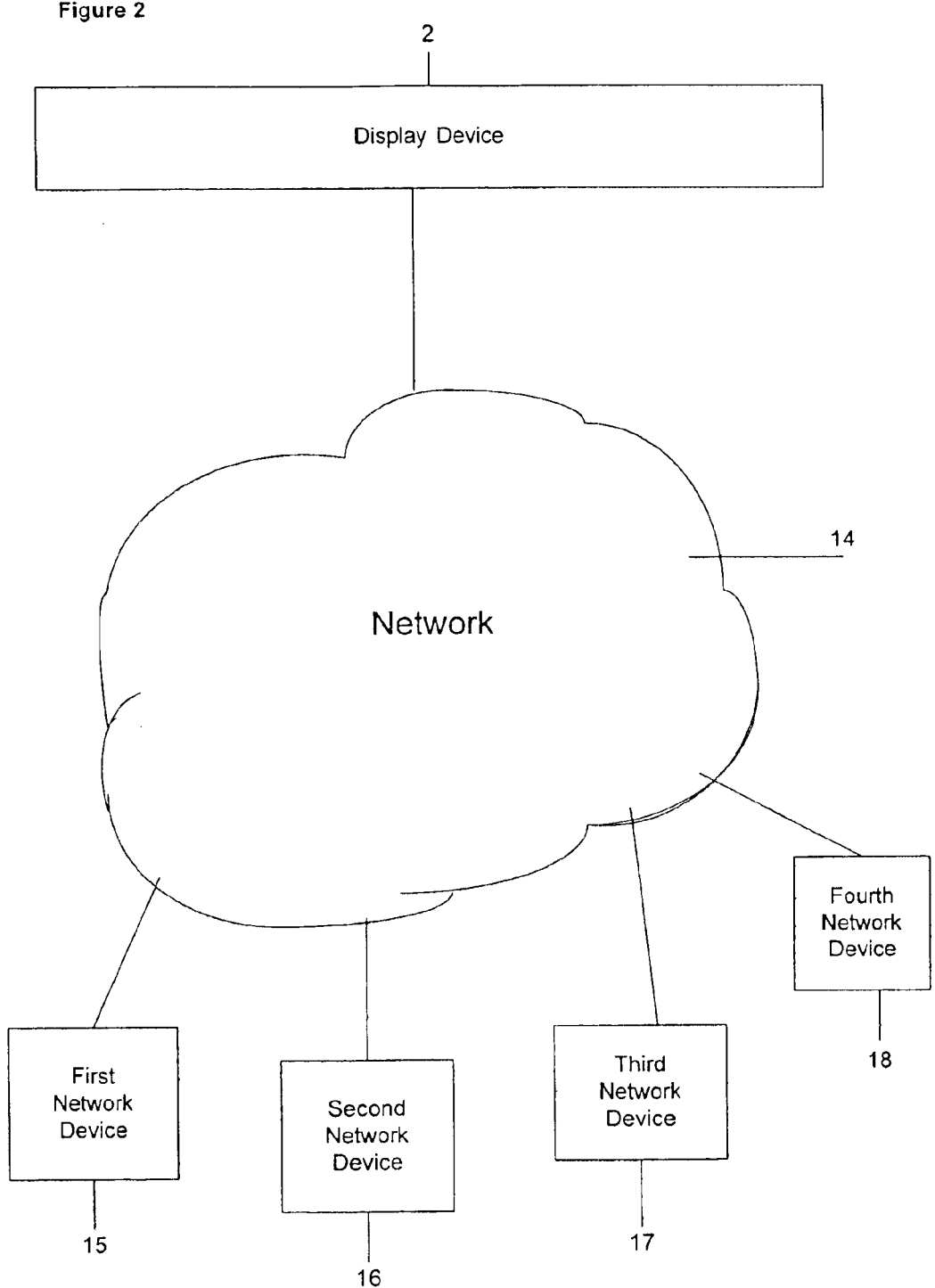
FIG. 2 is a block diagram of an example configuration for the illustrative embodiment of the present invention in a networked environment.

FIG. 2 depicts an example of an environment through which the display device 2 is accessed. The environment includes a network 14 to which a display device 2, a first network device 15, a second network device 16, a third network device 17, and a fourth network device 18 are interfaced. The four network devices 15–18 each have their own priority message queue 6, 8, 10, and 12.

Figure 3:
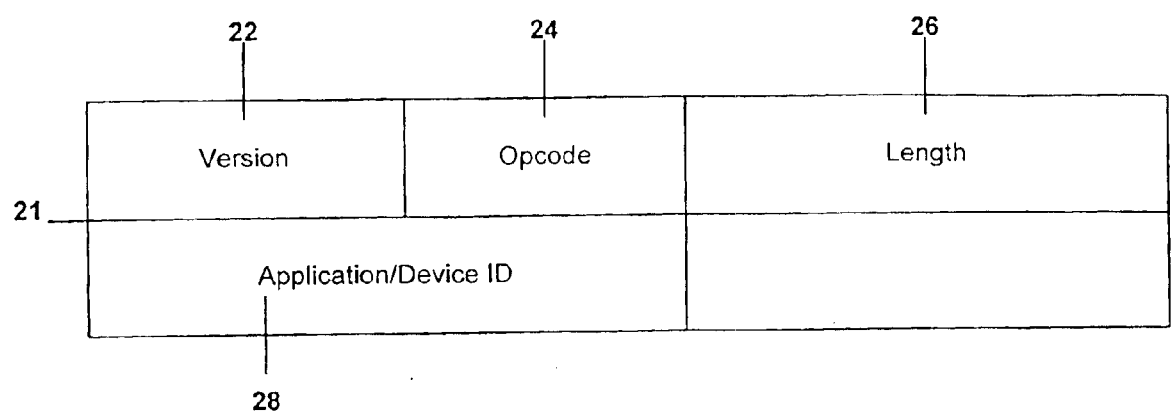
FIG. 3 is a block diagram of the message header packet utilized in the illustrative embodiment of the present invention.

The network messaging protocol follows a basic request-response model with the display device 2 executing the server side of the protocol and the network devices executing the client side of the protocol. A network device makes a request by sending a message to the display device 2 over the network 14, and the display device 2 responds with a response message that is directed back to the network device. FIG. 3 depicts a packet header 21 utilized by the protocol. The packet header 21 precedes the body of each message sent in the protocol. The packet header 21 includes a Version field 22 containing a software release version number for the priority messaging protocol. Requests may specify an opcode for a function that the client wishes to perform. To that end, the packet header 21 also contains an opcode field 24 containing an indication of an opcode. Each of the responses for the different types of requests has a unique operations code ("opcode") that appears in the packet header prior to the body of the response message. Correspondingly for each of the requests, the network device places a unique opcode in the request packet header. The packet header 21 further contains a Length field 26 indicating the total length of the remaining packet, and an Application ID field (Device ID) 28 which is unique to each device on the network and is assigned by the display device 2 when the device registers with the display device (See below).

In the network messaging protocol, the display device provides responses to request messages such as Queue Message requests; Dequeue Message requests, List Messages requests, Status Requests, and Unregister requests. These requests will be described in more detail below.

Figure 4A:
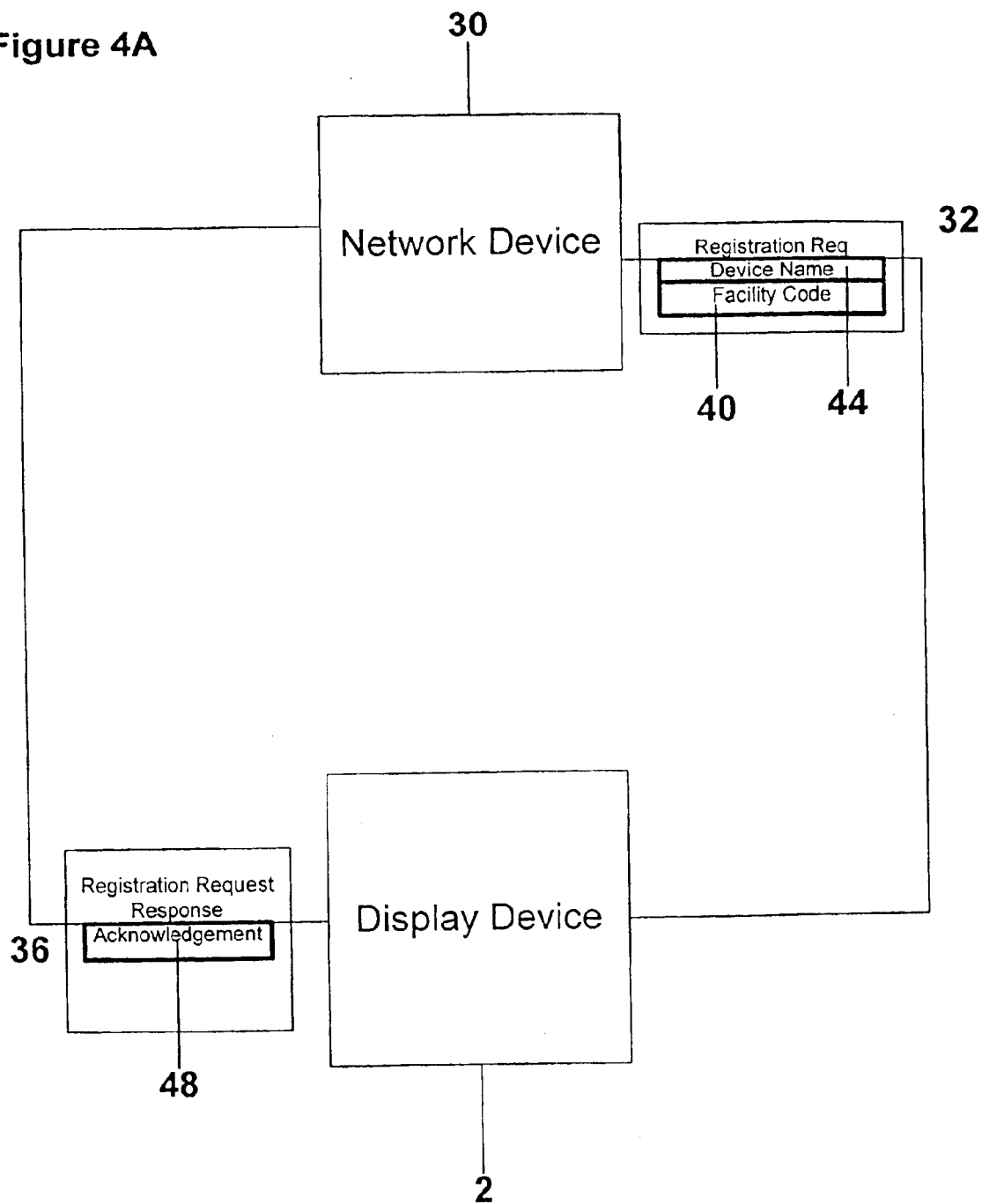
FIG. 4A is a flow chart depicting steps performed by the illustrative embodiment of the present invention during a device registration request message.

Prior to displaying any messages from a network device, the display device 2 must first register the network device. The display device 2 waits to receive a message containing a packet header 21 with an opcode indicating that the packet following the header is part of a Registration request. Because the network device sending the request has not registered, the Application ID field 28 in the packet header 21 has been set to zero. The registration process is depicted in FIG. 4A. A network device 30 sends a Registration request 32 to the display device 2. The registration request includes both a facility code 40 containing the network address of the network device and the device name 44 for the network device which are used to identify and locate the network device. Upon receiving the Registration request, the display device 2 assigns an Application/Device ID 28 to the network device making the request. The display device 2 sends a Registration Response message 36 containing an Acknowledgement 48 back to the network device 30. All further communications from the network device 30 to the display device 2 contains the Application/Device ID 28 within the packet header.

The frame format for the Registration request is depicted in FIG. 4B. The body of the Registration request 38 includes a Facility Code field 40, and a Length field 42, which indicates the length of the Name field 44. The Name field 44 holds a name of the network device that is making the registration request. The display device 2 sends a response message 36 (FIG. 4A) back to the network device 30. The registration request response message 36 contains the just assigned Application/Device ID 28 in the Application/Device ID field of the packet header 21. The body of the registration request response message 46 contains the Acknowledgment field 48, which contains the number zero if the device was successfully registered and a non-zero number corresponding to a protocol defined error type in the event there was an error in the registration process.

Figure 5A:
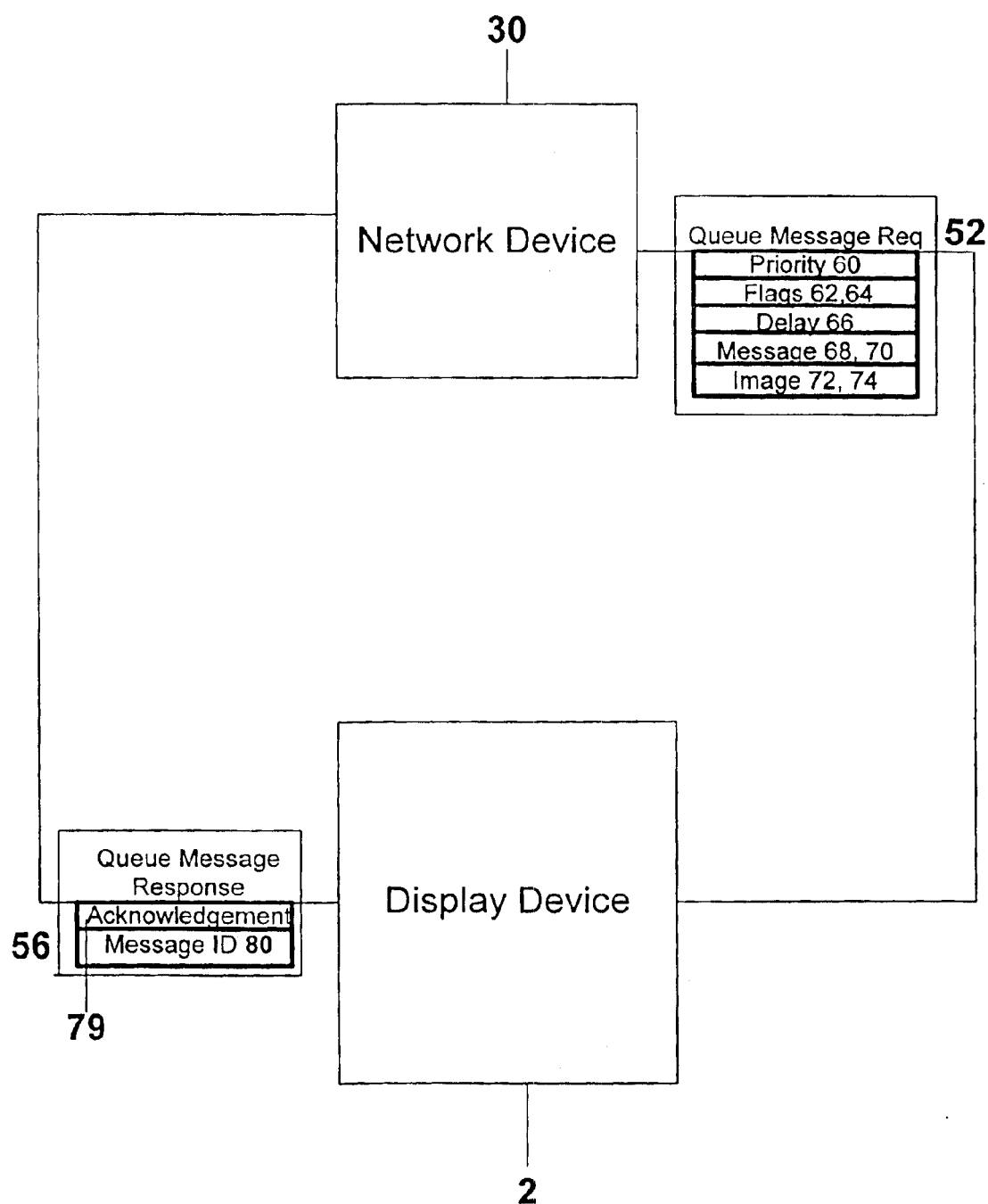
FIG. 5A is a flow chart depicting the steps followed by the illustrative embodiment of the present invention during a Queue Message request.

Once a network device has successfully registered with the display device 2, the display device accepts messages intended for display from the network device. Messages are sent to the display device using a Queue Message request. The sequence of events by which the display device receives a Queue Message request is depicted in FIG. 5A. A network device 30 sends a Queue Message request 52 to a display device 2. The Queue Message request 52 includes a priority level for the message 62, a type flag 64, and additional information indicating how the message is to be displayed including a feature flag 66 and delay parameter 68, along with the text 68, 70 and image information 72, 74 parts of the message. The display device 2 places the incoming message in the priority message queue allocated to the sending network device. The message is assigned a unique Message ID number 80 to distinguish it from the other messages waiting in the queue. The display device 2 responds to a Queue Message request with a Queue Message response 56. The Queue Message response 56 includes the Message ID 80 assigned to the message at the time it was placed in the priority message queue of the network device, and an Acknowledgement 79. The display device 2 uses Message ID's to track messages stored in the priority message queues.

Figure 5B:
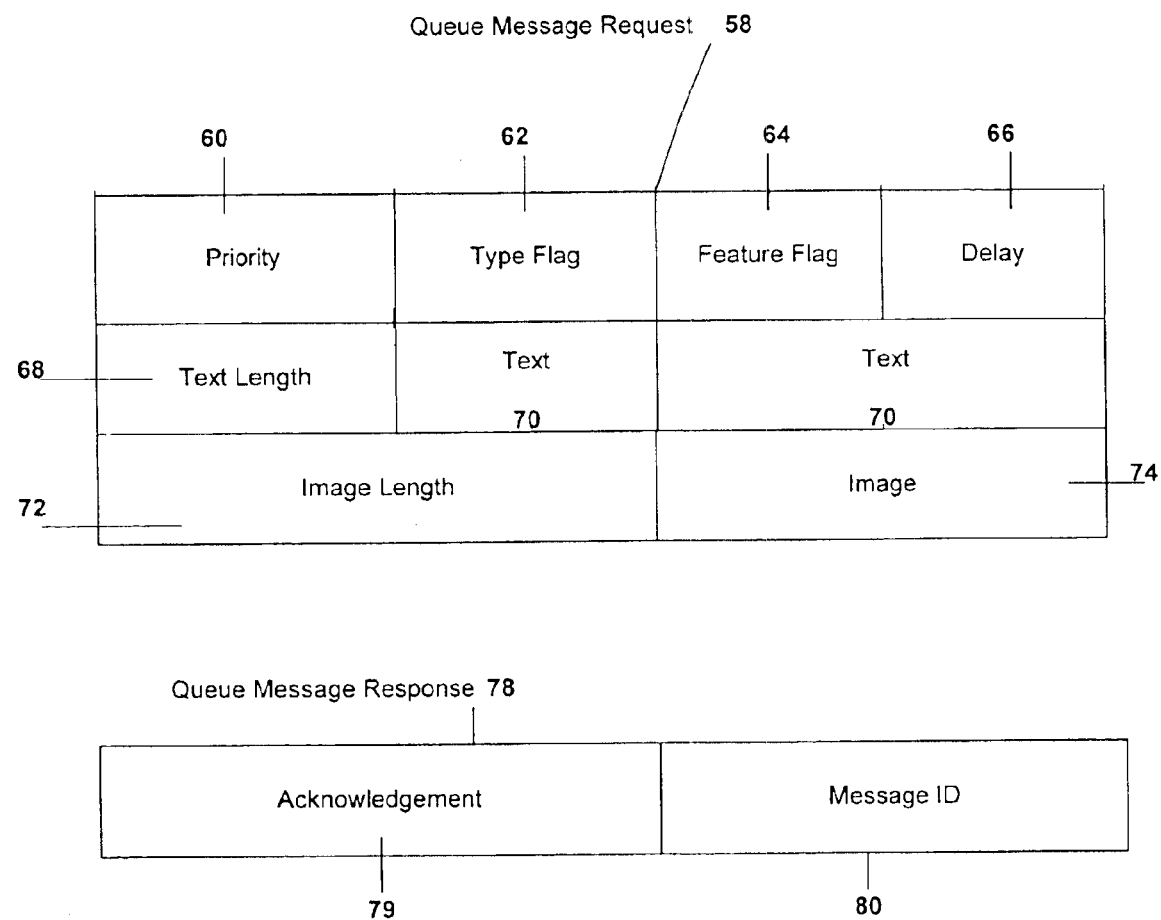
FIG. 5B is a block diagram that shows the format utilized in the body of the message packet during a Queue Message request and display device response to a Queue Message request.

The details of the Queue Message request frame format are depicted in FIG. 5B. The body of the Queue Message request 58 includes a Priority field 60, a Type Flag field 62 which indicates whether the message is a text message, an image message or both a text and image message, and a Feature Flag field 64 which indicates whether the display surface 4 should first be cleared, whether the message should scroll either horizontally or vertically, and whether the message should be persistent, that is, stay in the queue after display. The message body 58 further includes a Delay field 66 indicating how long the message should be displayed and a Text Length field 68 indicating the number of bytes in the text string being sent. A Text field 70 containing the text bytes, an optional Image Length field 72 indicating the number of bytes in an optional optional Image field 74 containing the image bytes in the message. The body of the Queue Message response 78 includes a Message ID field 80, the value of which is assigned by the display device 2 prior to the placing of the message in the priority message queue of the network device.

In an alternate embodiment, the extensible markup language (XML) may be used in the present invention. If XML is used for the priority messaging protocol, the exact structure of the message will be defined within an XML string.

Figure 5C:
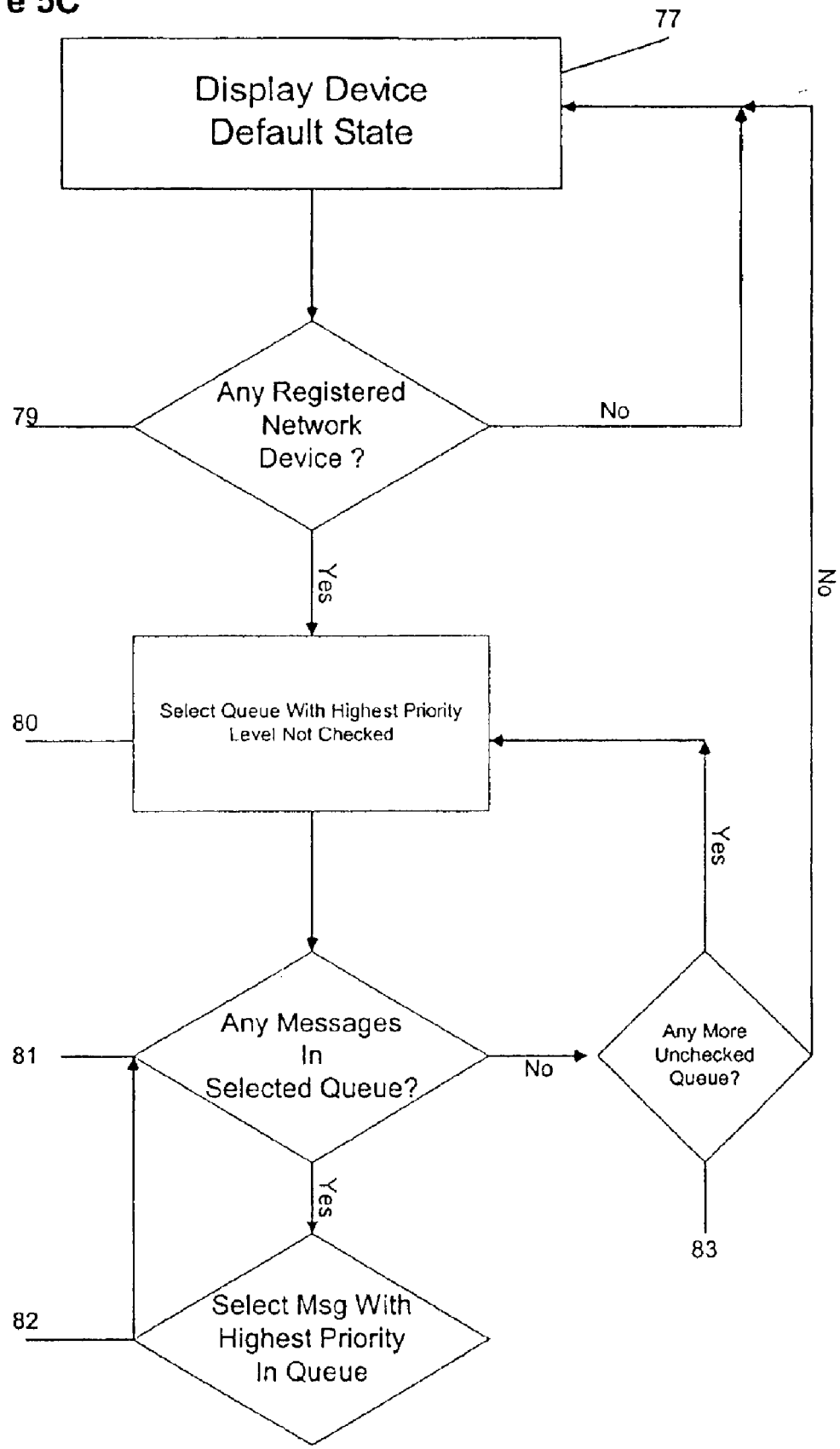
FIG. 5C is a flow chart of the decision sequence of the scheduling algorithm employed in the illustrative embodiment.

The display device 2 makes use of the information contained in the fields of a Queue Message request after determining which message is to be displayed. The determination of which message to display is reached by use of a scheduling algorithm. The display device's scheduling algorithm is implemented by a code which continuously checks for new messages. The sequence of events taking place in the algorithm is depicted in FIG. 5C. The display device will remain in its default display state 77 until such time as a network device registers with the display device (step 79). During the registration process, the creation of a priority message queue for a network device includes the step of assigning a priority level to that network devices queue. The scheduling algorithm looks for the network device with the highest priority level assigned to its queue (step 80). In the event that the priority message queue having the highest priority level also contains messages waiting to be displayed (step 81), the scheduling algorithm searches within that queue for the message to be displayed (step 82). In the event that the display device 2 determines that the priority message queue assigned the highest priority level does not contain any messages waiting to be displayed (step 83), the algorithm searches for the next highest priority level (step 80). The algorithm continues searching until a message queue with messages waiting to be displayed is found (step 82) or there are no of queues left to be searched (step 83). Once the scheduling algorithm has located a message queue with messages waiting to the displayed, the display device 2 retrieves the message from within that queue that contains the highest priority level (step 82). The message priority level is set by the network device at the time it sends a request to enqueue the message. The message may contain display characteristic information, such as a request to clear the screen, vertically scroll the message, horizontal scroll the message, or have the message be persistent. In the absence of such requested display description information, the display device will display the message according to previously set default parameters. When the message has been displayed for the requisite amount of time, the scheduling algorithm seeks out another message to be displayed. The algorithm runs continually as long as at least one network device is registered with the display device.

Figure 6A:
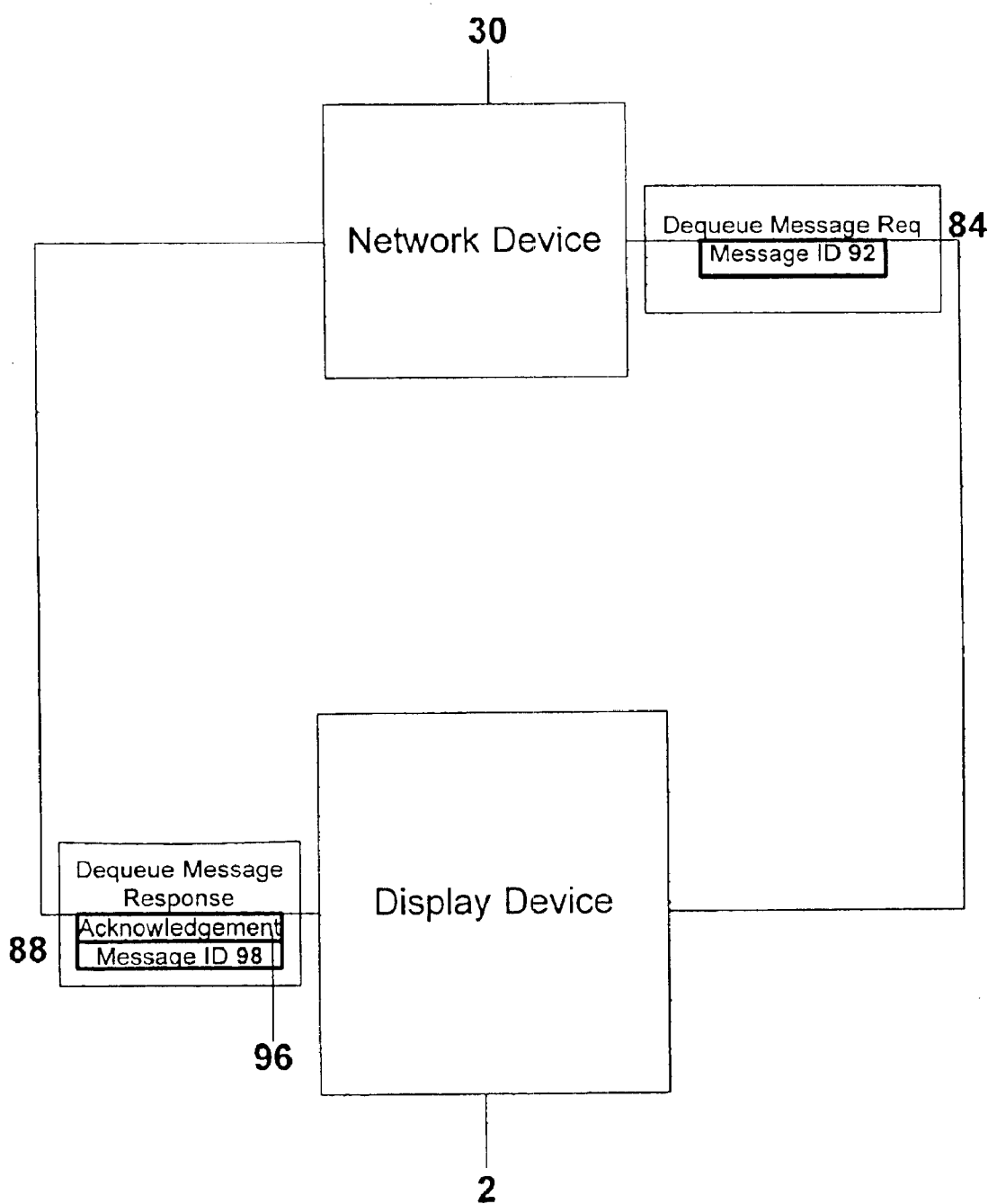
FIG. 6A is a flow chart depicting steps followed by the illustrative embodiment of the present invention during a device's Dequeue Message request.

The illustrative embodiment of the present invention also includes a Dequeue Message request. The Dequeue Message request removes a previously sent message from the priority message queue of the requesting network device. The sequence of steps followed by a display device 2 removing a message from a priority message queue in the illustrated embodiment of the present invention is depicted in FIG. 6A. A network device 30 sends a Dequeue Message request 84, which includes both a Device ID 28 identifying the network device, and a Message ID 92 identifying the message the network device wishes to remove from its queue, to the display device 2. The display device 2, upon receiving the Dequeue Message request 84, attempts to dequeue the message and sends a Dequeue Message response 88 which includes either an Acknowledgment 96 or an error message along with a return Message ID 98 identifying the message that was removed from the queue in the event the operation was successful.

Figure 6B:
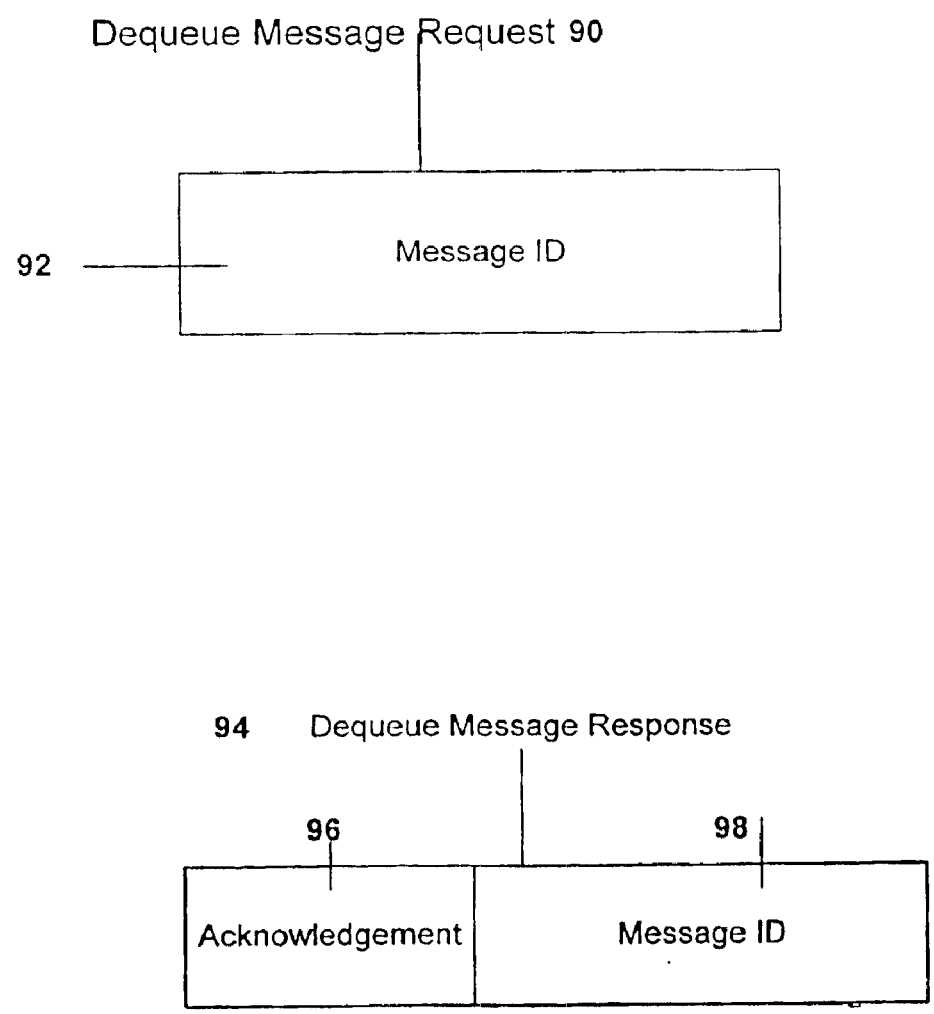
FIG. 6B is a block diagram that shows the format utilized in the body of the message packet during a Dequeue Message request and display device response to a Dequeue Message request.

FIG. 6B depicts the body of the Dequeue Message request 90. The Dequeue Message request 90 includes a Message ID field 92 identifying the particular message which the network device wishes to remove from its queue. The body of the Dequeue Message response 94 includes an Acknowledgment field 96 and a Message ID field 98 indicating message that was removed from the queue. In the event the message was successfully removed, the Acknowledgment field contains the number 0 and the Message ID contains the Message ID of the removed message. Conversely, if an error removing the message was encountered, the Acknowledgment field contains a non-zero number equating to a defined error message and the Message ID field is set to zero indicating no message was removed.

Figure 7A:
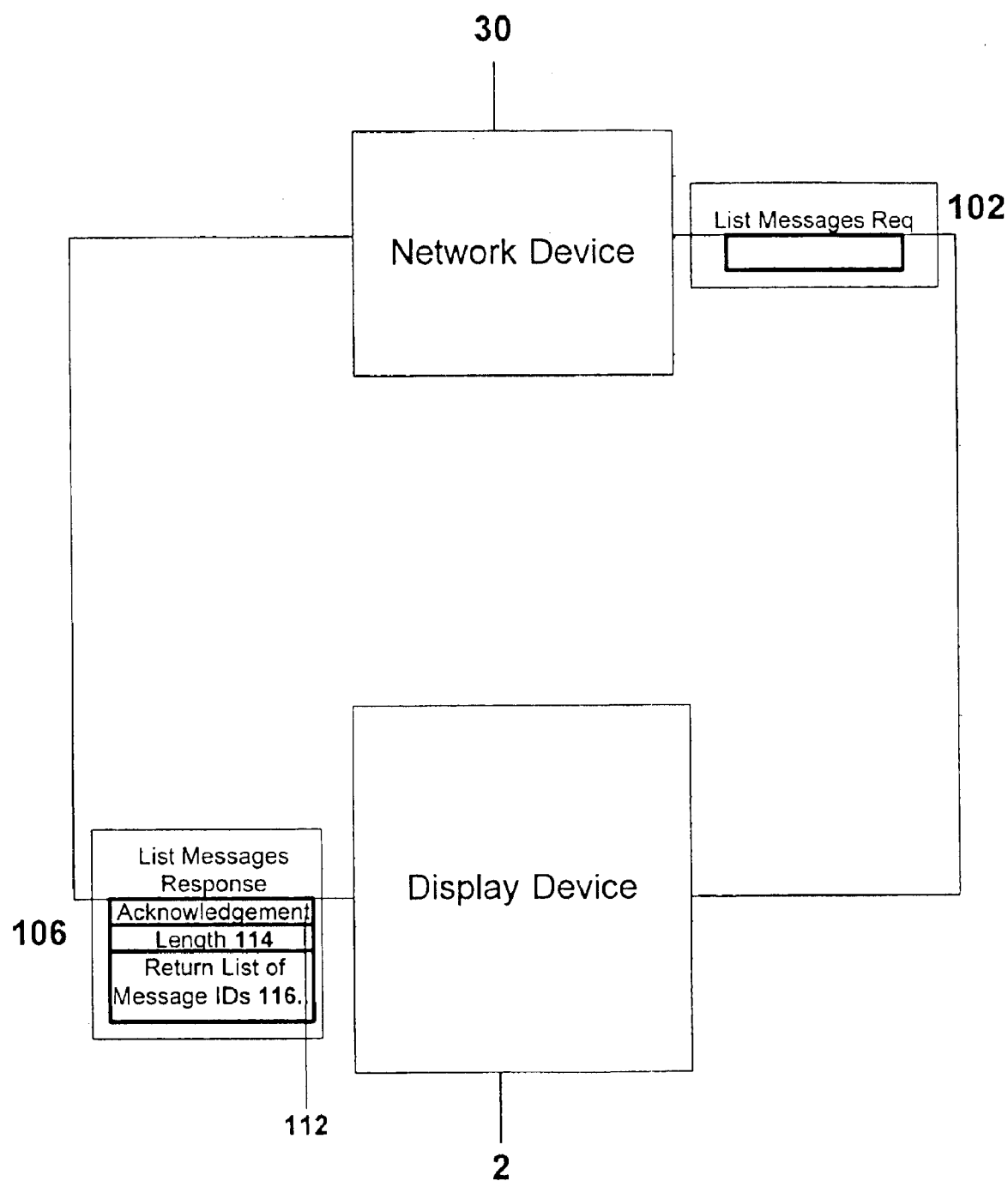
FIG. 7A is a flow chart depicting the steps followed by the illustrative embodiment of the present invention during a List Message request message.

The illustrative embodiment of the present invention also enables a network device to request a list of all the Message ID's in the priority message queue assigned to that network device. The sequence of events illustrating this List Message request is depicted in FIG. 7A. A network device 30 sends a List Message request 102 to a display device 2. The display device 2 uses the Application/Device ID 28 contained in the packet header 21 to check the priority message queue allocated to the network device 30 and retrieves a list of the Message ID's 116 in that priority message queue. The display device 2 sends a List Message response 106 back to the network device 30. The List Message response 106 includes an Acknowledgment/Error indicator 112 and a length parameter 114 indicating the length of the included list of all of the Message ID's 116 in the network device's priority message queue.

Figure 7B:
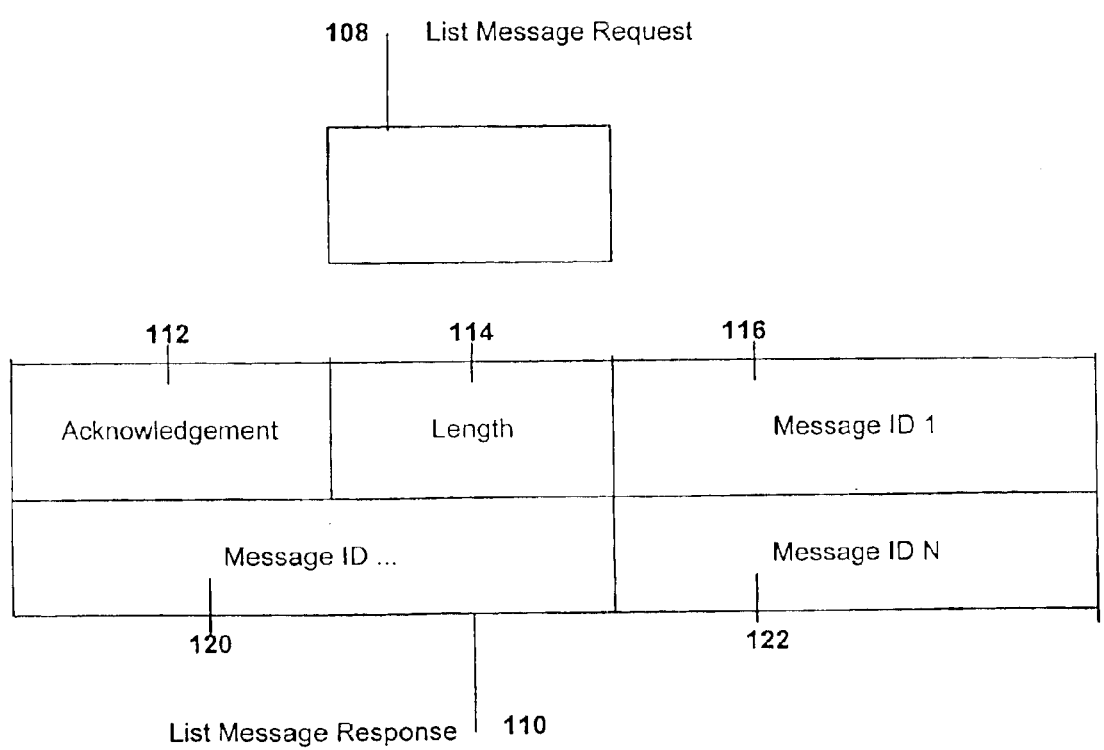
FIG. 7B is a block diagram that shows the format utilized in the body of the message packet during a List Message request and display device response to a List Message request.

FIG. 7B depicts the frame format used in the body of the List Message request and the body of the corresponding List Message response. The actual body of the List Message request is empty as the header contains both the opcode and the Device ID 28 (i.e. all the information required for the request). The body of the response to the List Message request 110 includes an Acknowledgment field, a Length field 1114 indicating the length of the rest of the response, and Message ID fields 1116, 120, 122 corresponding to fields for Message ID's one to N.

Figure 8A:
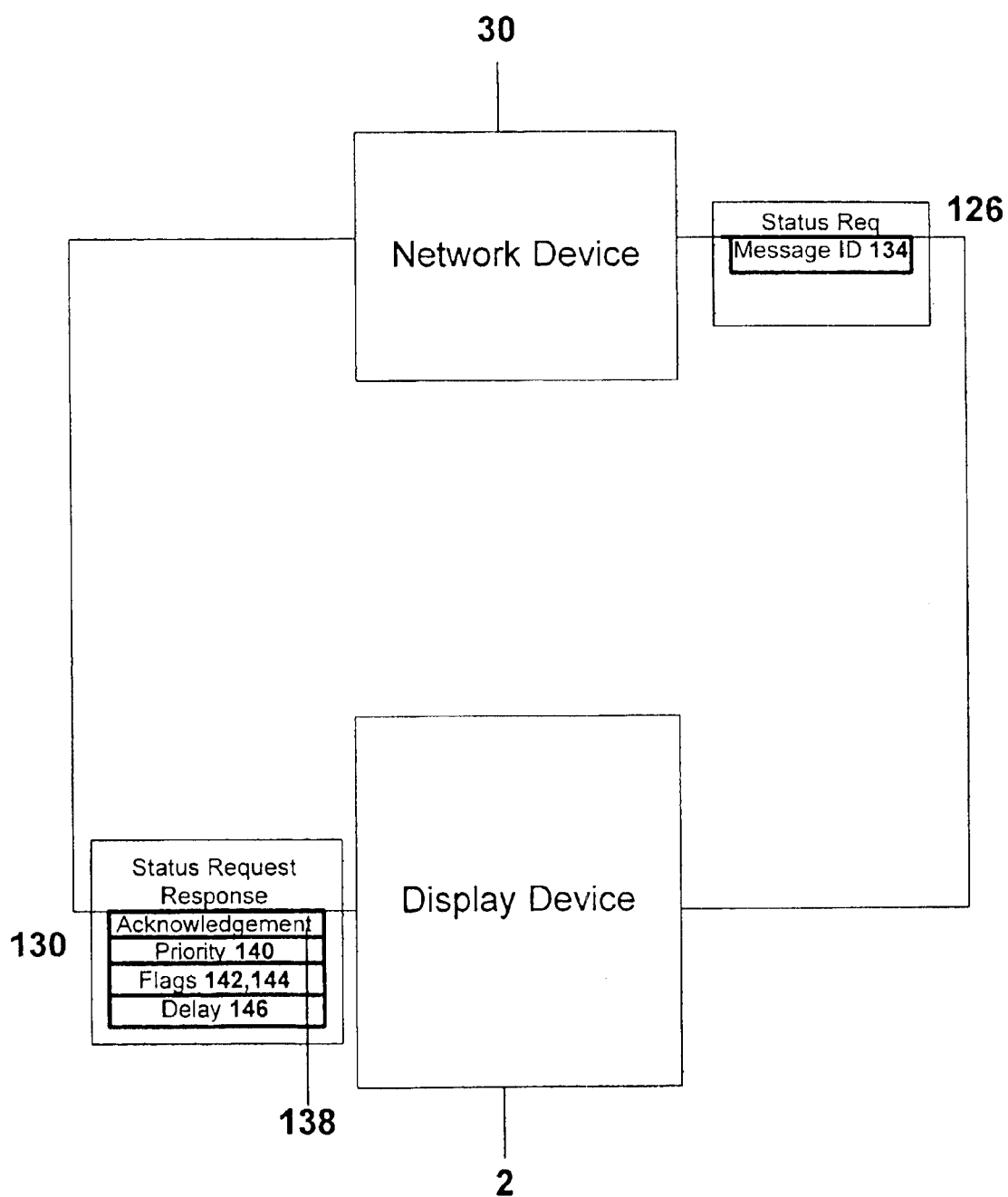
FIG. 8A is a flow chart depicting the steps followed by the illustrative embodiment of the present invention during a Status request.

The illustrative embodiment of the present invention provides a network device 30 with the capability to request the status of a particular message in its priority message queue. FIG. 8A depicts the sequence of events by which a network device 30 requests the status of a particular message in its priority message queue. A network device 30 sends a Status request 126 which includes the Message ID 134 for which a status update is requested. The display device 2 uses the Device ID 28 and the Message ID 134 to retrieve the message from the priority message queue allocated to the requesting network device and examines the message's details such as priority level and display characteristics. The display device 2 then sends a Status response 130 which includes an Acknowledgment/Error indicator 138, the message's priority level 140, type and feature flags 142,144 and a delay parameter 146, all of which mirrors the information in the message stored in the priority message queue.

Figure 8B:
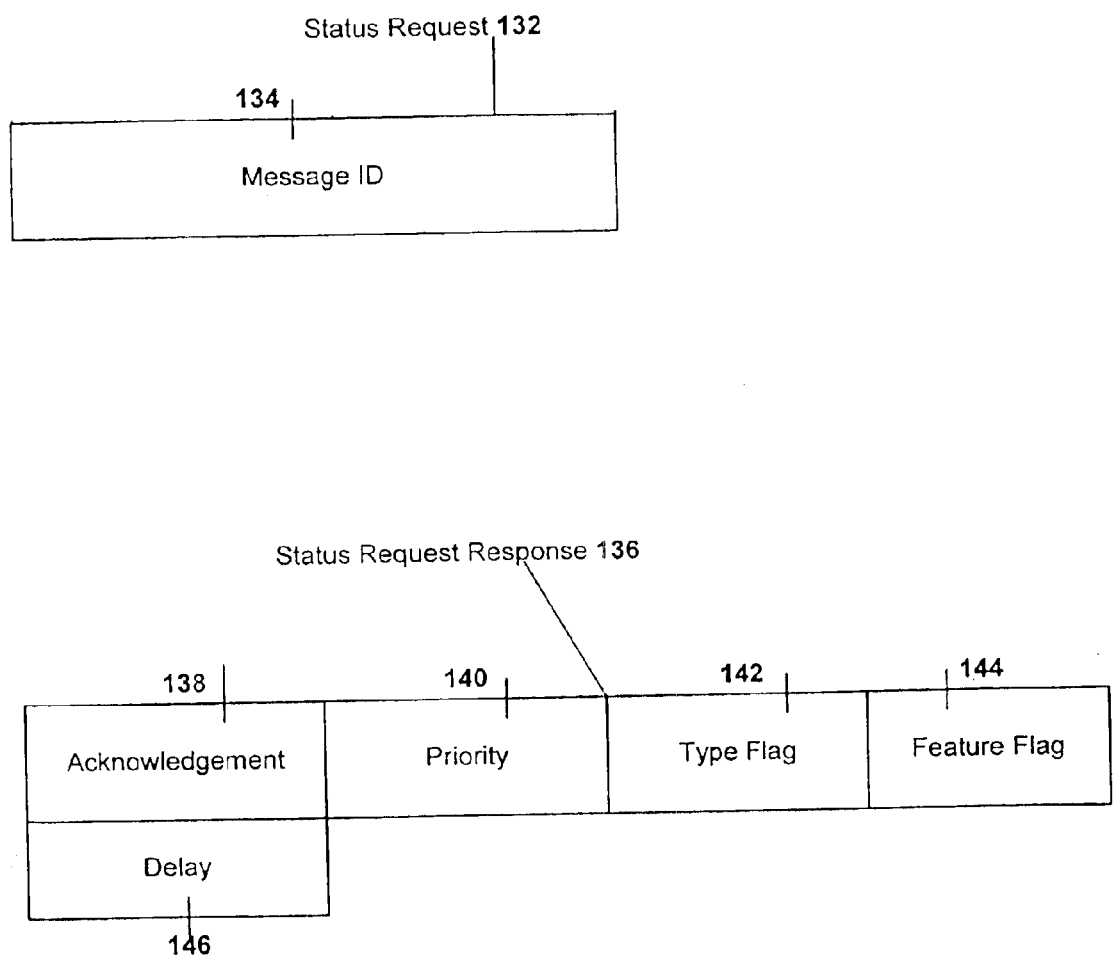
FIG. 8B is a block diagram that shows the format utilized in the body of the message packet during a Status request and display device response to a status request message.

FIG. 8B depicts the message body of the Status request 132 which contains a Message ID field 134, as the message header Opcode indicates the message was a status request. The message body of the Status request response 136 includes an Acknowledgment field 138, a Priority field 140 indicating the messages priority, a Type Flag field 142 indicating the type of message, text, image, or both text and image, a Feature Flag field 144 indicating the display features associated with the message, and a Delay field 146 indicating the length and time the message is to be displayed. This information provides a snapshot of how the display device 2 recorded the message in the priority queue.

Figure 9A:
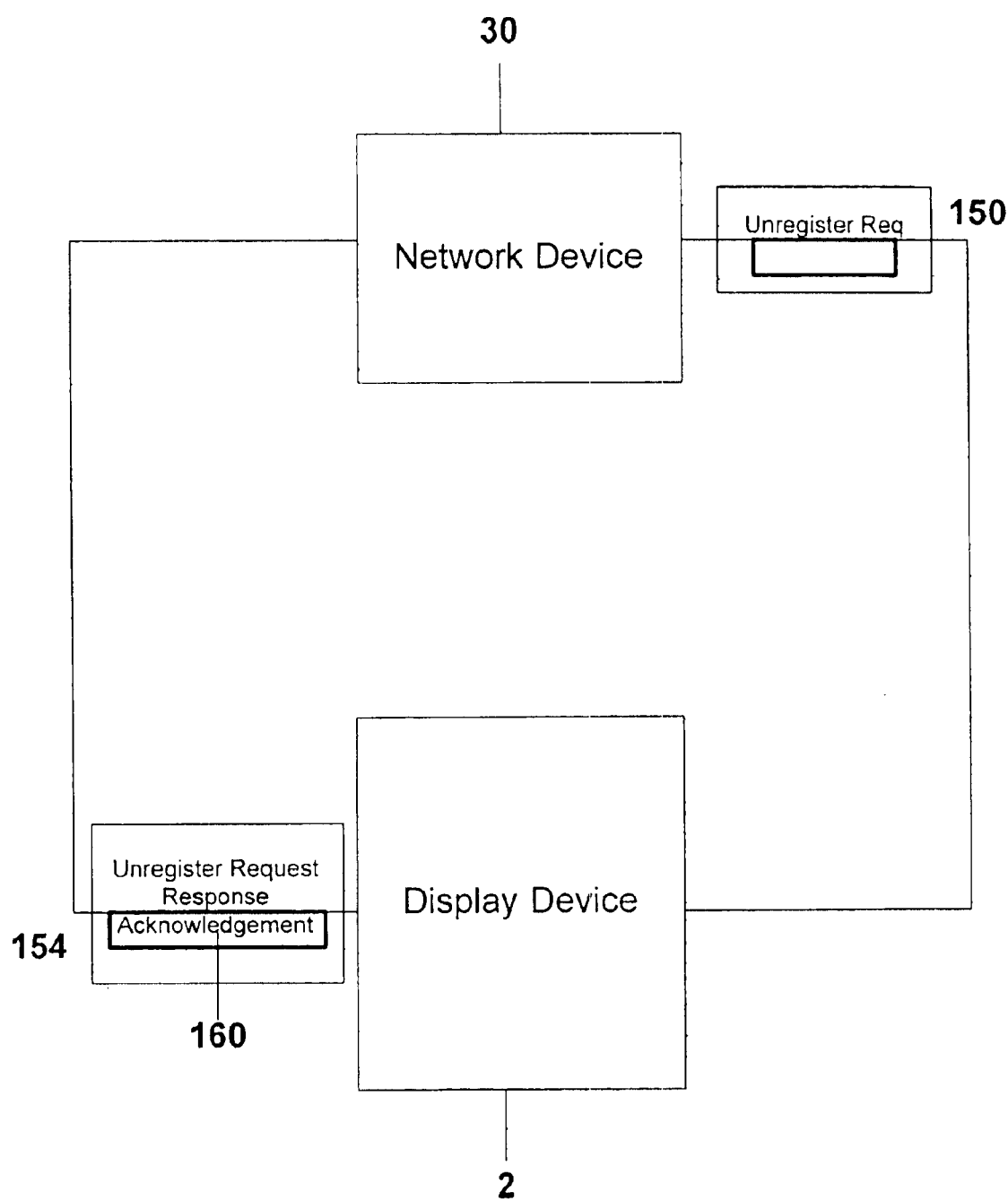
FIG. 9A is a flow chart depicting the steps followed by the illustrative embodiment of the present invention during a Unregister request.

The illustrative embodiment of the present invention also includes an Unregister request which is sent by a network device when it has completed accessing the display device. FIG. 9A depicts the steps of the Unregister request. A network device 30 sends an Unregister request 150 to the display device 2. The display device 2 deallocates the priority message queue assigned to the requesting network device 30 and sends an Unregister response 154 containing an Acknowledgment/Error indication 160 back to the network device 30.

Figure 9B:
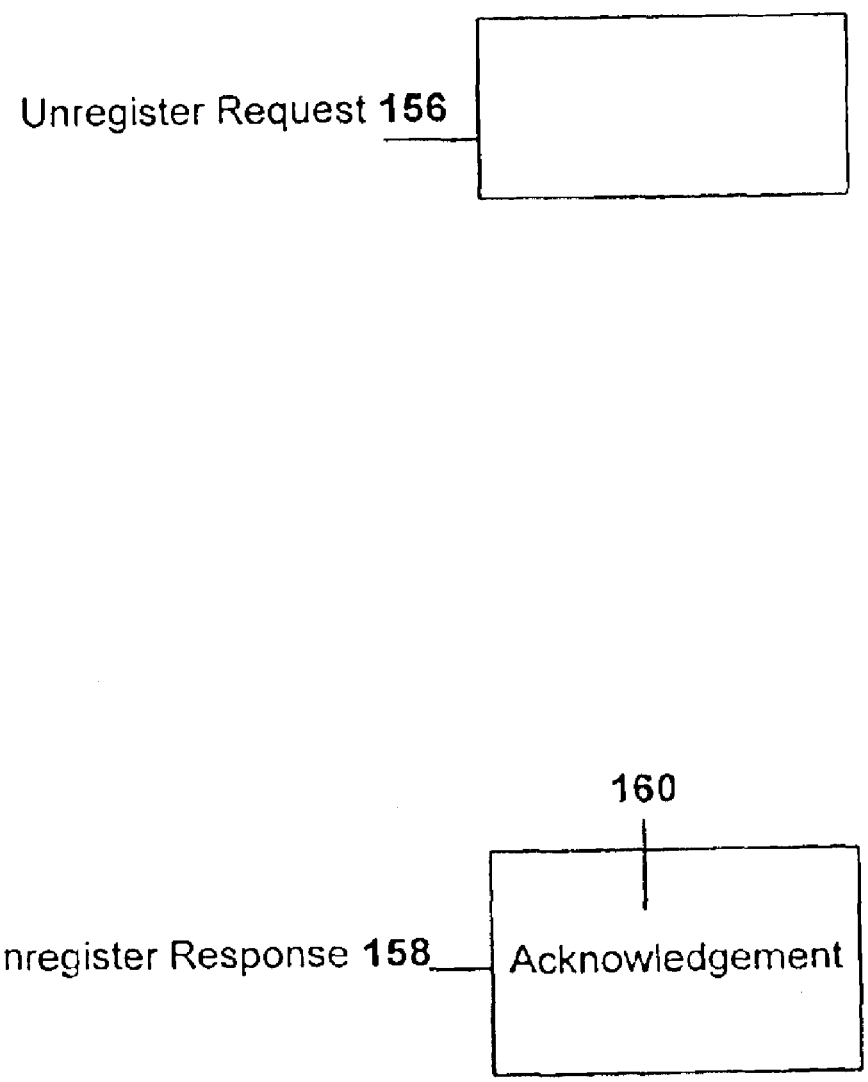
FIG. 9B is a block diagram that shows the format utilized in the body of the message packet during a Unregister request and display device response to an Unregister request.

FIG. 9B depicts the message body of the Unregister request 156 which is empty, as the message header opcode 24 indicates the message is an Unregister Request 156, and the particular Device ID 28 is also contained in the packet header 21. The body of the Unregister response message 158 consists solely of an Acknowledgment/Error field 160.

It will thus be seen that the invention efficiently attains the objects made apparent from the preceding description. Since certain changes may be made without departing from the scope of the present invention, it is intended that all matter contained in the above description or shown in the accompanying drawings be interpreted as illustrative and not in a literal sense. Practitioners of the art will realize that the separate requests and responses illustrated herein may have fields added to the request or response, and/or may have fields deleted from the request or response, and additional types of requests and responses may be added from one protocol version to the next without departing from the scope of the present invention.

I claim:

1. In a motor vehicle, a display device apparatus interfaced with a network located within said motor vehicle, said apparatus comprising:
a display surface in said motor vehicle;
a display manager for determining what messages are displayed on the display surface, said display manager registering at least two network devices connected to said network through a bi-directional communication process and subsequently receiving messages for display on the display device from said at least two network devices, said display manager prioritizing the received messages to determine a sequence in which said received messages are displayed on said display surface; and
a separate priority message queue created on said display device for each network device registered with the display device, each priority message queue having a priority level assigned to it based on the identity of the registered network device, each display message received by the display device from a registered network device being placed in the priority message queue that is assigned to said network device.

2. The apparatus of claim 1 wherein said display device and said network devices communicate over an Internet Protocol (IP) based network.

3. Tee apparatus of claim 1 wherein said display manager registers a selected one of said network devices, said network device being a global positioning satellite receiver.

4. The apparatus of claim 1 wherein said display manager registers a selected one of said network devices, said network device being a cellular phone.

5. The apparatus of claim 1 wherein said display manager registers a selected one of said network devices, said network device being an automobile stereo.

6. The apparatus of claim 1 wherein the display message placed in said priority message queue contains text.

7. The apparatus of claim 1 wherein the display message placed in said priority message queue contains a graphical image.

8. The apparatus of claim 1 wherein the display message placed in said priority message queue message contains text and a graphical image.

9. The apparatus of claim 1 wherein said display manager assigns a Message Identification number to each said display message placed in said priority message queue and identifies a message priority level in each said display message as it is placed into said priority message queue, said message priority level being encoded into said display message when received by said display manager and extracted by said display manager.

10. The apparatus of claim 9 wherein said display manager selects a selected priority message queue with a highest priority level, said selected priority message queue containing at least one message, said display manager selects a selected display message with a highest message priority level from within said selected priority message queue with a highest priority level, and said display manager displays said selected display message with a highest priority level on the display surface of said display device.

11. The apparatus of claim 9 wherein said display manager removes a selected display message in a priority message queue in response to a request from said network device.

12. The apparatus of claim 9 wherein said display manager maintains a list of Message Identification numbers of all of the messages in a priority message queue assigned to a particular network device, said display manager providing said list to said particular network device in response to a request from said particular network device.

13. The apparatus of claim 9 wherein said display manager maintains a list of network devices registered with said display device, said display manager removing a selected network device from said list in response to a request from said selected network device.

14. The apparatus of claim 9 wherein said display manager provides the status of a selected display message in a priority message queue assigned to a network device to said network device in response to a request from said network device.

15. The apparatus of claim 9 wherein said display manager displays a display message with display characteristics that were encoded within said display message when received by said display device.

16. The apparatus of claim 15 wherein said display characteristics include at least one of a request to clear the display surface, a request to be persistent, a request to scroll the message, and a duration of time to display the message.

* * * * *